(12) United States Patent
Winnik et al.

(10) Patent No.: US 7,914,710 B2
(45) Date of Patent: Mar. 29, 2011

(54) LOADING QUANTUM DOTS INTO THERMO-RESPONSIVE MICROGELS BY REVERSIBLE TRANSFER FROM ORGANIC SOLVENTS TO WATER

(76) Inventors: Mitchell Alan Winnik, Toronto (CA); Lei Shen, Toronto (CA); Andrij Pich, Dresden (DE)

( * ) Notice: Subject to any disclaimer, the term of this patent is extended or adjusted under 35 U.S.C. 154(b) by 275 days.

(21) Appl. No.: 12/149,524

(22) Filed: May 2, 2008

(65) Prior Publication Data

US 2010/0025640 A1 Feb. 4, 2010

Related U.S. Application Data

(60) Provisional application No. 60/924,159, filed on May 2, 2007.

(51) Int. Cl.
*H01B 1/10* (2006.01)
(52) U.S. Cl. ............. 252/519.4; 252/521.1; 252/521.2; 252/521.5; 977/774
(58) Field of Classification Search ............. 252/519.4, 252/521.1, 521.2, 521.5; 977/774
See application file for complete search history.

(56) References Cited

U.S. PATENT DOCUMENTS

| | | | | |
|---|---|---|---|---|
| 2006/0088713 A1* | 4/2006 | Dykstra et al. | .............. | 428/402 |
| 2006/0257485 A1* | 11/2006 | Kumacheva | .............. | 424/486 |
| 2009/0020924 A1* | 1/2009 | Lin | .............. | 264/605 |

FOREIGN PATENT DOCUMENTS

WO WO 2004081072 A2 * 9/2004

OTHER PUBLICATIONS

Chang et al., Microfluidic assisted preparation of CdSe/ZnS nanocrystals encapsulated into poly (DL-lactide-co-glycolide) microcapsules, Nanotechnology, 18 (2007), 305305, pp. 1-8.*
Wang et al., Surface Modification of CdSe and CdSe/ZnS Semiconductor Nanocrystals with Poly(N,N-dimethylaminoethyl methacrylate), Macromolecules, 39 (2006), 3664-3672.*
Pelton, R., "Temperature-sensitive aqueous microgels", Advances in Colloid and Interface Science, 85(2000)1-33.
Nayak et al., "Soft Nanotechnology with Soft Nanoparticles", Nanotechnology, Angew. Chem. Int. Ed 2005, 44, 7686-7708.
Peppas et al., "Hydrogels in Biology and Medicine: From Molecular Principles to Bionanotechnology", Adv. Mater., 2006, 18, 1345-1360.
Das et al, "Microgels: Old Materials with New Applications", Annu. Rev. Mater. Res. 2006, 36:117-42.
Zhang et al., "Polymer Microgels: Reactors for Semiconductor, Metal, and Magnetic Nanoparticles", J. Am. Chem. Soc, 2004, 126, 7908-7914.
Antonietti et al., "Nonclassical Shapes of Noble-Metal Colloids by Synthesis in Microgel Nanoreactors", Angew. Chem. Int. Ed. Engl. 1997, 36, No. 19, 2080-2083.
Biffis et al., "Microgel-Stabilized Metal Nanoclusters: Size Control by Microgel Nanomorphology", Adv. Mater. 2003, 15, No. 18, Sep. 16, 1551-1555.
Gorelikov et al., "Hybrid Microgels Photoresponsive in the Near-Infrared Spectral Range", J. Am. Chem. Soc, 2004, 126, 15938-15939.
Kuang et al., "Fabrication of Multicolor-Encoded Microspheres by Tagging Semiconductor Nanocrystals to Hydrogel Spheres", Adv. Mater. 2005, 17, No. 3, Feb. 10, 267-270.
Gong et al., "Incorporating Fluorescent CdTe Nanocrystals into a Hydrogel via Hydrogen Bonding: Toward Fluorescent Microspheres with Temperature-Responsive Properties", Chem. Mater, 2005, 17, 2648-2653.
Fujii et al, "Stimulus-Responsive Emulsifiers Based on Nanocomposite Microgel Particles", Adv. Mater. 2005, 17, No. 8, Ap 18, 1014-1018.
Ngai et al., "Novel emulsions stabilized by pH and temperature sensitive microgels", Chem. Commun. 2005, 331-333.
Crowther et al., "Swelling behavior of poly-N-Isopropylacrylamide microgel particles in alcoholic solutions", Colloid Polym Sci 276: 46-51 (1998).

* cited by examiner

*Primary Examiner* — Douglas Mc Ginty
(74) *Attorney, Agent, or Firm* — Lynn C. Schumacher; Hill & Schumacher

(57) ABSTRACT

Method for the preparation of inorganic-NP-composite microgels is based on the reversible transfer of microgels between water and an organic solvent such as tetrahydrofuran (THF). The method is used to produce semiconductor nanocrystals, often referred to as quantum dots (QDs) which are well known for their unique optical, electrical, magnetic and catalytic properties, as the inorganic NPs, recognizing that the best quality QDs are synthesized by a high temperature process in organic media, and have their surface covered with hydrophobic ligands (such as trioctylphosphine oxide, TOPO) that render the NPs insoluble in an aqueous solution.

13 Claims, 9 Drawing Sheets

LOADING QUANTUM DOTS INTO THERMO-RESPONSIVE MICROGELS BY REVERSIBLE TRANSFER FROM ORGANIC SOLVENTS TO WATER

CROSS REFERENCE TO RELATED U.S. APPLICATIONS

This patent application relates to, and claims the priority benefit from, U.S. Provisional Patent Application Ser. No. 60/924,159 filed on May 2, 2007, in English, entitled LOADING QUANTUM DOTS INTO THERMO-RESPONSIVE MICROGELS BY REVERSIBLE TRANSFER FROM ORGANIC SOLVENTS TO WATER, which is incorporated herein by reference in its entirety.

FIELD OF THE INVENTION

The present invention relates to a method for the preparation of a composite material including microgels containing inorganic nanoparticles (NPs) based on the reversible transfer of microgels between water and a water-miscible organic solvent such as, but not limited to, tetrahydrofuran (THF).

BACKGROUND OF THE INVENTION

Colloidal microgels have numerous attractive properties such as defined morphology, high porosity and adjustable dimensions that can respond to changes in temperature, pH and solvent quality, and the ability to act as carriers for drugs, biomolecules, synthetic polymers or inorganic nanocrystals through fluid media. As a consequence, these materials are becoming increasingly important for their potential applications in drug and gene delivery, catalysis, sensing, fabrication of photonic crystals, and separation and purification technologies, see a) R. Pelton, *Adv. Colloid Interface Sci.* 2000, 85, 1; b) S. Nayak, L. A. Lyon, *Angew. Chem. Int. Ed.* 2005, 44, 7686; c) N. A. Peppas, J. Z. Hilt, A. Khademhosseini, R. Langer, *Adv. Mater.* 2006, 18, 1345; d) M. Das, H. Zhang, E. Kumacheva, *Annu. Rev. Mater. Res.* 2006, 36, 117; and J. Zhang, S. Xu, E. Kumacheva, *J. Am. Chem. Soc.* 2004, 126, 7908.

In such systems, the microgel particles fulfill several important functions, namely a) stabilization and transport of the loaded material in the medium, b) potential controlled release of the load in response to external stimuli, and c) easy recovery by separation from the continuous phase.

Two rather distinct approaches have been taken for loading different substances into microgel particles. The first utilizes the microgel as a template for in-situ preparation of nano-scale materials such as inorganic nanoparticles (NPs). In this case, the nanoparticles are trapped in the microgel interior by hydrophobic forces, hydrogen bonding, or electrostatic interactions. This approach has been realized for both aqueous microgels[2] and microgels dispersed in organic solvents, see M. Antonietti, F. Grohn, J. Hartmann, L. Bronstein, *Angew. Chem. Int. Ed.* 1997, 36, 2080; and A. Biffis, N. Orlandi, B. Corain, *Adv. Mater.* 2003, 15, 1551. The attractive features of this approach are the effective control of the nanoparticle dimensions within the microgel, and flexibility in control of the nanoparticle loading.

The second approach involves filling the microgel by diffusion of pre-formed nanoparticles into the microgel, accompanied by trapping due to the electrostatic interactions or hydrogen bonding with polymer chains, see I. Gorelikov, L. M. Field, E. Kumacheva, *J. Am. Chem. Soc.* 2004, 126, 15938; M. Kuang, D. Yang, H. Bao, M. Gao, H. Mohwald, M. Jiang, *Adv. Mater.* 2005, 17, 267; and Y. Gong, M. Gao, D. Wang, H. Mohwald, *Chem. Mater.* 2005, 17, 2648. This technique offers some important advantages in terms of the simplicity of the process and independent adjustment of the nanoparticle properties. This approach, however, has been employed primarily in aqueous media and has limited utility for incorporating inorganic nanocrystals synthesized in organic solutions. In both of these approaches, the microgel network serves not only as a container for transporting the nanoparticles, but as a functional unit that can be attached to substrates or respond to stimuli like changes in temperature or pH. By using the two methods described above, a variety of composite microgel particles have been prepared, containing NPs of conducting polymers, (see a) J. Mrkic and B. R. Saunders, *J. Colloid and Interface Sci.* 2000, 222, 75; b) A. Pich, Y. Lu, H. P. Adler, T. Schmidt and K. Arndt, *Polymer* 2002, 43, 5723; c) A. Pich, Y. Lu, V. Boyko, Arndt, K.-F. and Adler, H.-J. P., *Polymer* 2003, 44, 7651; d) Pich A, Lu Y, Boyko V, Richter S, K. Arndt and H. P. Adler, *Polymer* 2004, 45, 1079; e) E. Lopez-Cabarcos, D. Mecerreyes, B. Sierra-Martin, M. S. Romero-Cano, P. Strunz and A. Fernandez-Barbero, *Phys. Chem. Chem. Phys.* 2004, 6, 1396; d) J. Rubio Retama, E. Lopez Cabarcos, D. Mecerreyes and B. Lopez-Ruiz, *Biosens. Bioelectron.* 2004, 20, 1111); noble metals, (see a) G. Sharma and M. Ballauff, *Macromol. Rapid Comm.* 2004, 25, 547; b) Y. Mei, G. Sharma, Y. Lu, M. Ballauff, M. Drechsler, T. Irrgang and R. Kempe, *Langmuir* 2005, 21, 12229; c)Y. Lu, Y. Mei, M. Drechsler and M. Ballauff, *Angew. Chem. Int. Ed.* 2006, 45, 813; d) D. Suzuki and H. Kawaguchi, *Langmuir* 2005, 21, 12016; e) J. Zhang, S. Xu and E. Kumacheva, *Adv. Mater.* 2005, 17, 2336; f) A. Pich, A. Karak, Y. Lu, A. Ghosh and H. J. P. Adler, *Macromol. Rapid Comm.* 2006, 27, 344; g) A. Biffis, N. Orlandi and B. Corain, *Adv. Mater* 2003, 15, 1551), metal oxides, (see a) M. Gao, X. Peng and J. Shen, *Thin Solid Films* 1994, 248, 106; b) C. Menager, O. Sandre, J. Mangili and V. Cabuil, *Polymer* 2004, 45, 2475); metal sulfides, (see a) C. Bai, Y. Fang, Y. Zhang and B. Chen, *Langmuir* 2004, 20, 263; b) A. Pich, J. Hain, Y. Lu, V. Boyko, Y. Prots and H. Adler, *Macromolecules* 2005, 38, 6610); and biominerals, (see a) N. Nassif, N. Gehrke, N. Pinna, N. Shirshova, K. Tauer, M. Antonietti and H. Cölfen, *Angew. Chem.* 2005, 117, 6158; b) G. Zhang, D. Wang, Z. Gu, J. Hartmann and H. Möhwald, *Chem. Mater.* 2005, 17, 5268; c) G. Zhang, D. Wang, Z. Gu and H. Möhwald, *Langmuir* 2005, 21, 9143).

In most cases, the composite microgels preserve the colloidal stability and maintain the stimuli responsiveness of the pure microgels. At the same time, the NPs carried by the composite exhibit the typical physical and chemical properties of nanomaterials themselves.

The methods for the preparation of composite microgels described above require the adjustment of the microgel and nanoparticles (or their syntheses) to the nature of the medium, whether water or an organic solvent. The medium in which the composite microgels are formed using these strategies is normally the only medium in which they are stable and can be employed. This limitation can be overcome by the consideration of one important property of the microgel itself, which has not been exploited for microgel-NP composites: the ability of many kinds of microgels to form stable colloidal solutions in solvents of very different polarity.

Some authors have noted the nearly universal ability of microgels to form emulsions (see a) S. Fujii, E. S. Read, B. P. Binks and S. P. Armes, *Adv. Mater.* 2005, 17:1014; b) T. Ngai, S. H. Behrens and H. Auweter, *Chem. Commun.* 2005, 3, 331; c) T. Ngai, S. H. Behrens and H. Auweter, *Macromolecules* 2006, 39, 8171; d) S. Fujii, S. P. Armes, B. P. Binks and R. Murakami, *Langmuir* 2006, 22, 6818; e) A. Y. C. Koh and B.

R. Saunders, *Langmuir* 2005, 21, 6734), or colloidal solutions in mixed solvents (see H. M. Crowther and B. Vincent, *Coll. Polym. Sci.* 1998, 276, 46).

Many microgel compositions are soluble not only in water but also in organic solvents. Nevertheless, little attention has been paid, however, to the possibility of transferring microgels from water to organic solvents or from organic solvents to aqueous media. In the present invention the inventors show that by selecting solvents that are both miscible with water and also good solvents for the microgel network, The inventors also contemplate that if an aqueous solution of the microgel is stirred with an organic solvent such as dichloromethane (DCM), dichloroethane, ethyl acetate, or anisol, which is not miscible with water, the microgel can be induced to transfer from the aqueous medium to the organic phase. One can transfer the microgel from its natural aqueous environment to an organic phase by a solvent exchange process. If this process is reversible and if the microgels retain their stability upon transfer, new designs of composite microgels and their applications become possible.

SUMMARY OF THE INVENTION

In the present invention, it is shown that by selecting solvents that are both miscible with water and also good solvents for the microgel network, one can transfer the microgel from its natural aqueous environment to an organic phase by a solvent exchange process.

Embodiments of the present invention provide methods for the preparation of inorganic-nanoparticle-composite microgels, comprising the steps of:

a) synthesizing microgels in water;

b) transferring the microgels to a selected organic solvent to form a microgel dispersion, the microgels of the microgel dispersion having a microgel network, the microgels being selected to contain moieties that can interact with an outer surface of inorganic nanoparticles; and c) adding a solution of said inorganic nanoparticles to the microgel dispersion, said nanoparticles having an outer surface covered with hydrophobic ligands that render the inorganic nanoparticles insoluble in an aqueous solution, and wherein some of said hydrophobic ligands are replaced by said moieties, giving rise to substantially irreversible incorporation of the nanoparticles into the microgel network to produce the composite material and release of the hydrophobic ligands to the organic solvent.

In an exemplary embodiment, the new method described herein for the preparation of the composite of microgels having incorporated therein inorganic nanoparticles is based on the reversible transfer of microgels between water and tetrahydrofuran (THF) as the organic solvent. Preferred inorganic nanoparticles (NPs) include semiconductor nanocrystals, often referred to as quantum dots (QDs) which are well known for their unique optical, electrical, magnetic and catalytic properties, recognizing that the best quality QDs are synthesized by a high temperature process in organic media, and have their surface covered with hydrophobic ligands (such as trioctylphosphine oxide, TOPO) that render the NPs insoluble in an aqueous solution. On the other hand, many of the applications of these particles, for example in biological systems, require colloidal solutions in water.

A further understanding of the functional and advantageous aspects of the invention can be realized by reference to the following detailed description and drawings.

BRIEF DESCRIPTION OF THE DRAWINGS

The invention will be more fully understood from the following detailed description thereof taken in connection with the accompanying drawings, which form a part of this application, and in which:

FIG. 6 (*e, f*) shows TEM images of individual PNIPAM/VIm (2.78%) microgel particles filled with different amounts of CdSe QDs (mg QD/g polymer): e) 0.5; f) 2.3. In each image, the QDs are distributed uniformly inside the microgel; FIGS. 6 (*g, h*) shows TEM images of $PbS_{1108}$ QDs incorporated into g) PNIPAM/AA (25.0%) microgel particles and h) PVCL/AAEM/VIm (2.88%) microgel particles. In the term $PbS_{1108}$, 1108 refers to the absorption peak wavelength of the PbS QDs.

DETAILED DESCRIPTION OF THE INVENTION

Figure 1:
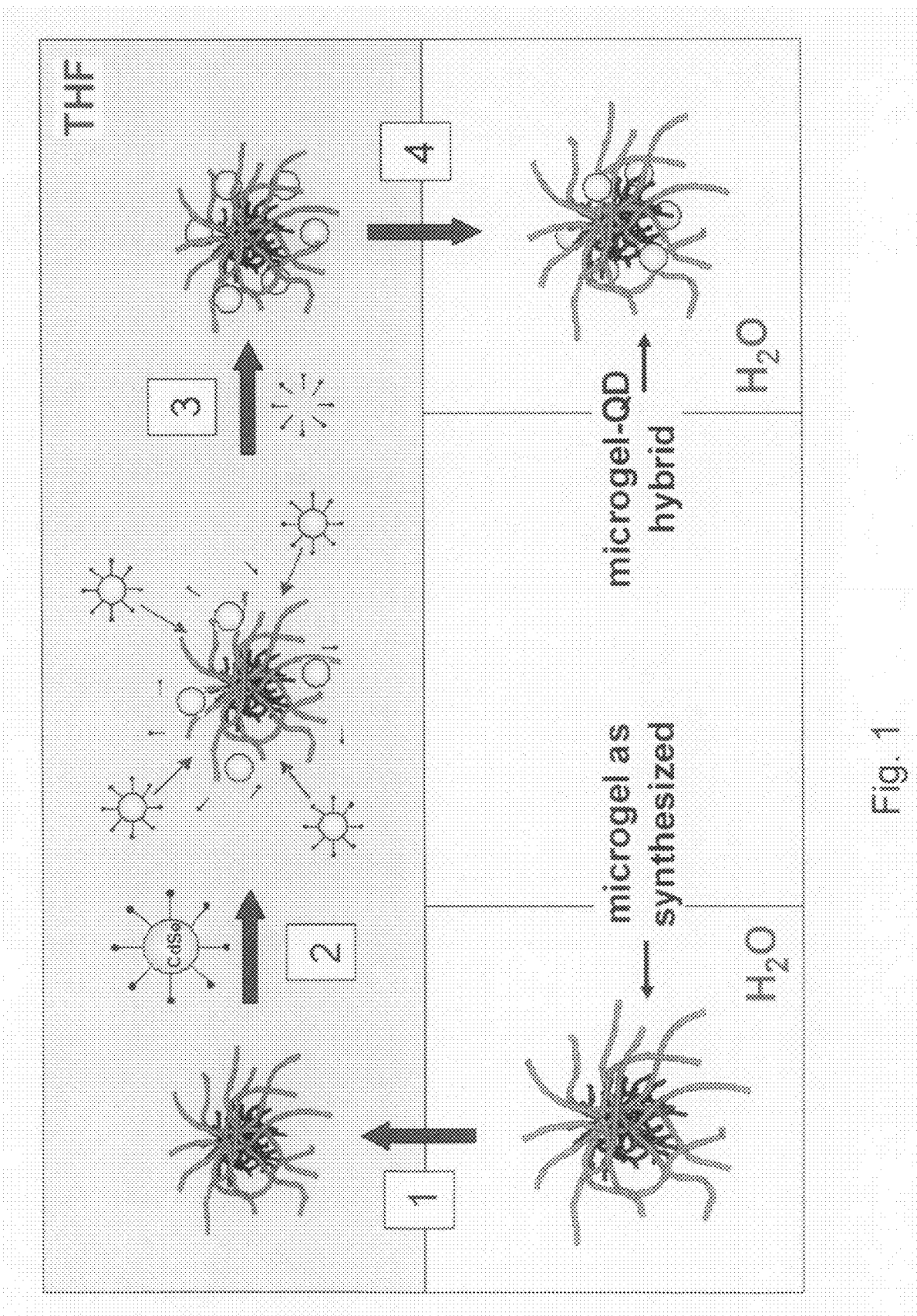
FIG. 1 illustrates a process for loading CdSe/TOPO nanoparticles (QD) into microgels by the reversible transfer method: 1) transfer of aqueous microgel to THF by solvent exchange; 2) addition of CdSe/TOPO followed by partial TOPO replacement by imidazole units (ligand exchange) and loading of CdSe into the microgel; 3) dialysis (or centrifugation) in THF to remove free TOPO molecules; 4) transfer of the microgel containing CdSe to the aqueous phase by solvent exchange.

Generally speaking, the systems described herein are directed to methods for loading quantum dots into thermo-responsive microgels. As required, embodiments of the present invention are disclosed herein. However, the disclosed embodiments are merely exemplary, and it should be understood that the invention may be embodied in many various and alternative forms. The Figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to embodiments for loading quantum dots into thermo-responsive microgels.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

The method disclosed herein for the preparation of inorganic-nanoparticle-composite microgels is based on the reversible transfer of microgels between water and an organic solvent, such as but not limited to tetrahydrofuran. The method involves the use of semiconductor nanocrystals, often referred to as quantum dots (QDs), which are well known for their unique optical, electrical, magnetic and catalytic properties (see a) M. P. Bruchez, M. Moronne, P. Gin, S. Weiss and A. P. Alivisatos, *Science* 1998, 281, 2013; b) W. C. W. Chan and S. Nie, *Science* 1998, 281, 2016; c) X. Michalet, F. F. Pinaud, L. A. Bentolila, J. M. Tsay, S. Doose, J. J. Li, G. Sundaresan, A. M. Wu, S. S. Gambhir and S. Weiss, *Science* 2005, 307, 538; d) T. M. Jovin, *Nat. Biotechnol.* 2003, 21, 32; e) I. L. Medintz, H. T. Uyeda, E. R. Goldman and H. Mattoussi, *Nat. Mater* 2005, 4, 435; f) J. M. Klostranec and W. C. W. Chan, *Adv. Mater.* 2006, 18, 1953) recognizing that the best quality QDs are synthesized by a high temperature process in organic media, and have their surface covered with hydrophobic ligands such as trioctylphosphine oxide (TOPO) or oleic acid that render the NPs insoluble in an aqueous solution.

On the other hand, many of the applications of these particles, for example in biological systems (see H. Weller, *Angew. Chem. Int. Ed.* 1993, 32, 41; b) A. P. Alivisatos, *J. Phys. Chem.* 1996, 100, 13226) require colloidal solutions in water. The working hypothesis is that appropriately chosen microgels can be synthesized to contain functional groups that can serve as surface ligands for the QDs. These microgels can capture QDs via a ligand exchange process in an organic medium, where the QDs form colloidal solutions. Then the composite microgels can be transferred into water, in which the microgel is also able to provide colloidal stability.

The general methodology for hybrid microgel synthesis is presented in FIG. 1. In the first step, microgels synthesized in water are transferred to THF by dialysis. Then a THF solution of CdSe/TOPO is added to the microgel dispersion in THF. The diffusion of QDs into the swollen microgel particles is followed by the replacement of TOPO with imidazole groups present in the microgel network. This process leads to essentially irreversible incorporation of the QDs in the microgel and the release of TOPO molecules to the organic solvent. At this point, free TOPO molecules can be removed by dialysis against THF or by centrifugation and re-suspension of the microgels. The composite microgels are easily sedimented by normal centrifugation and can be re-suspended either in THF or any THF-miscible solvent. Thus either by dialysis or by centrifugation-redispersion, the microgel particles loaded with QDs can be transferred back to the aqueous phase. The inventors believe that this method opens new possibilities for the incorporation of different nanomaterials into microgels and demonstrates the versatility of the microgel particles to provide reversible transport of different materials between organic and aqueous media.

Thus, embodiments of the present invention broadly provide methods for the preparation of inorganic-nanoparticle-composite microgels, comprising the steps of:
 a) synthesizing microgels in water,
 b) transferring the microgels to a selected organic solvent to form a microgel dispersion;
 c) adding a solution of inorganic nanoparticles to the microgel dispersion, said nanoparticles having an outer surface covered with hydrophobic ligands that render the inorganic nanoparticles insoluble in aqueous solution, and wherein some of the said hydrophobic ligands are replaced by moieties which are integrated into a microgel network, giving rise to substantially irreversible incorporation of the nanoparticles into the microgel to produce the composite microgels and the release of the hydrophobic ligands to the organic solvent.

The process may include a step of transferring the composite microgels back into water. Alternatively, the process may include a step of transferring the composite microgels back into an organic solvent.

The microgel may be selected to contain amine groups amine groups or other basic nitrogen-containing groups as associated moieties that can interact with the outer surface of the inorganic nanoparticle. The amine groups may include any one of primary, secondary and tertiary alkyl amines, and aromatic amines, and the basic nitrogen-containing groups may include imidazole and pyridine groups.

In one embodiment the microgel may be selected to contain carboxylic acid groups as associated moieties that can interact with the outer surface of the inorganic nanoparticle.

The microgel may be selected to include phosphonic acid groups or phosphate groups which will interact with the surfaces of various inorganic nanoparticles. Alternatively, in another embodiment the microgel may be selected to contain 1,2-diol groups or 1,3-diol groups as associated moieties that can interact with the outer surface of the inorganic nanoparticle.

The inventors contemplate that the microgels may also be selected to contain polyethylene glycol (PEG) chains, introduced, for example, by use of a polyethylene glycol macromonomer during the microgel synthesis. These PEG chains may provide enhanced colloidal stability at high ionic strength or in the presence of biological micromolecules such as proteins.

The organic solvent may be selected to be miscible with water and may include, but is not restricted to, tetrahydrofuran (THF), acteone, methyethyl ketone, N,N-dimethyl formamide (DMF), and N-Methyl pyrrolidone (NMP).

Alternatively, the organic solvent may be selected to be not miscible with water and may include, but is not restricted to, dichloromethane (DCM), dichloroethane, ethyl acetate, and anisole.

The inorganic nanoparticles may be, but not restricted to, semiconductor nanoparticles. For example, the semiconductor nanoparticles may be CdSe, CdSe/ZnS core-shell nanoparticles, PbS, lanthanide fluoride nanoparticles ($LnF_3$, where Ln refers to any lanthanide ion), lanthanide phosphate nanoparticles, lanthanide vanadate nanoparticles, iron oxide nanoparticles such as those composed of $Fe_3O_4$, and semiconductor nanoparticles with an inorganic overcoating. The inorganic overcoating may be silica. The lanthanide ion may be any one or combination of $La^{3+}$, $Gd^{3+}$, $Eu^{3+}$, $Pr^{+3}$, $Nd^{+3}$, $Sm^{+3}$, $Tb^{+3}$ $Ho^{+3}$, $Er^{+3}$, $Tm^{+3}$ and $Lu^{+3}$.

The hydrophobic ligands may be for example, but are not restricted to, any one of trioctylphosphine oxide, (TOPO), oleyl amine, hexadecyl amine, and oleic acid (OA).

The transferring the microgels from water to a selected organic solvent may be performed using for example, but not limited to, any one of dialysis against the organic solvent, centrifugation, stirring with a water immiscible solvent in which the microgel is soluble and can form a stable colloidal dispersion. The step of transferring the microgels from the organic solvent to water may be performed using for example, but not limited to, either dialysis against said organic solvent, or centrifugation, followed by resuspension in water.

The present invention will be further illustrated using the following exemplary, non-limiting examples.

For illustrative purposes, in most of the embodiments disclosed herein, the inventors employ the imidazole group as an amine-based ligand and examine two different polymer microgel compositions as the carriers: poly(N-isopropylacrylamide) (PNIPAM) and poly(N-vinylcaprolactam-co-acetoacetylethyl methacrylate) (PVCL/AAEM), see a) R. Pelton, *Adv. Colloid Interface Sci.* 2000, 85, 1; a) V. Boyko, A. Pich, Y. Lu, S. Richter, K.-F. Arndt and H.-J. Adler, *Polymer* 2003, 44/25, 7821; and A. Pich, A. Teissier, V. Boyko, Y. Lu and H.-J. P. Adler, *Macromolecules* 2006, 39, 7701. Both types of microgels were synthesized in the presence of different amounts of N-vinylimidazole (VIm, 1 to 5 mol %) as the functional co-monomer. We refer to these two types of microgels as PVCL/VIm and PNIPAM/VIm, respectively. The VIm units allow the microgels in THF solution to capture CdSe/TOPO QDs via a ligand exchange process (see H. Skaff and T. Emrick, *Chem. Commun.* 2003, 1, 52; K. Sill and T. Emrick, *Chem. Mater.* 2004, 16, 1240; X.-S. Wang, T. E. Dykstra, X. Lou, M. R. Salvador, I. Manners, G. D. Scholes and M. A. Winnik, *J. Am. Chem. Soc.* 2004, 126, 7784; M. Wang, J. K. Oh, T. E. Dykstra, X. Lou, G. D. Scholes and M. A. Winnik, *Macromolecules* 2006, 39, 3664; and M. Wang, T. E. Dykstra, X. Lou, M. R. Salvador, G. D. Scholes and M. A. Winnik, *Angew. Chem. Int. Ed.* 2006, 45, 2221).

The inventors also prepared PNIPAM microgels in the presence of 25 mol % acrylic acid (PNIPAM/AA). Here the inventors wished to explore whether the —COOH groups of these microgels could replace oleic acid from the surface of oleic acid-stabilized PbS (PbS/OA) quantum dots. We show that these microgels, synthesized in water, can be transferred to tetrahydrofuran (THF) solution. When exposed to solutions of CdSe/TOPO in THF, they incorporate the QDs into the microgel network, accompanied by loss of TOPO to the solvent. Afterward, the QD-microgel composites can be transferred to water where they form stable colloidal solutions. We believe that this method opens new possibilities for the incorporation of a variety of different nanomaterials into microgels and demonstrates the versatility of the microgel particles to provide reversible transport of different materials between organic and aqueous media.

Figure 2:
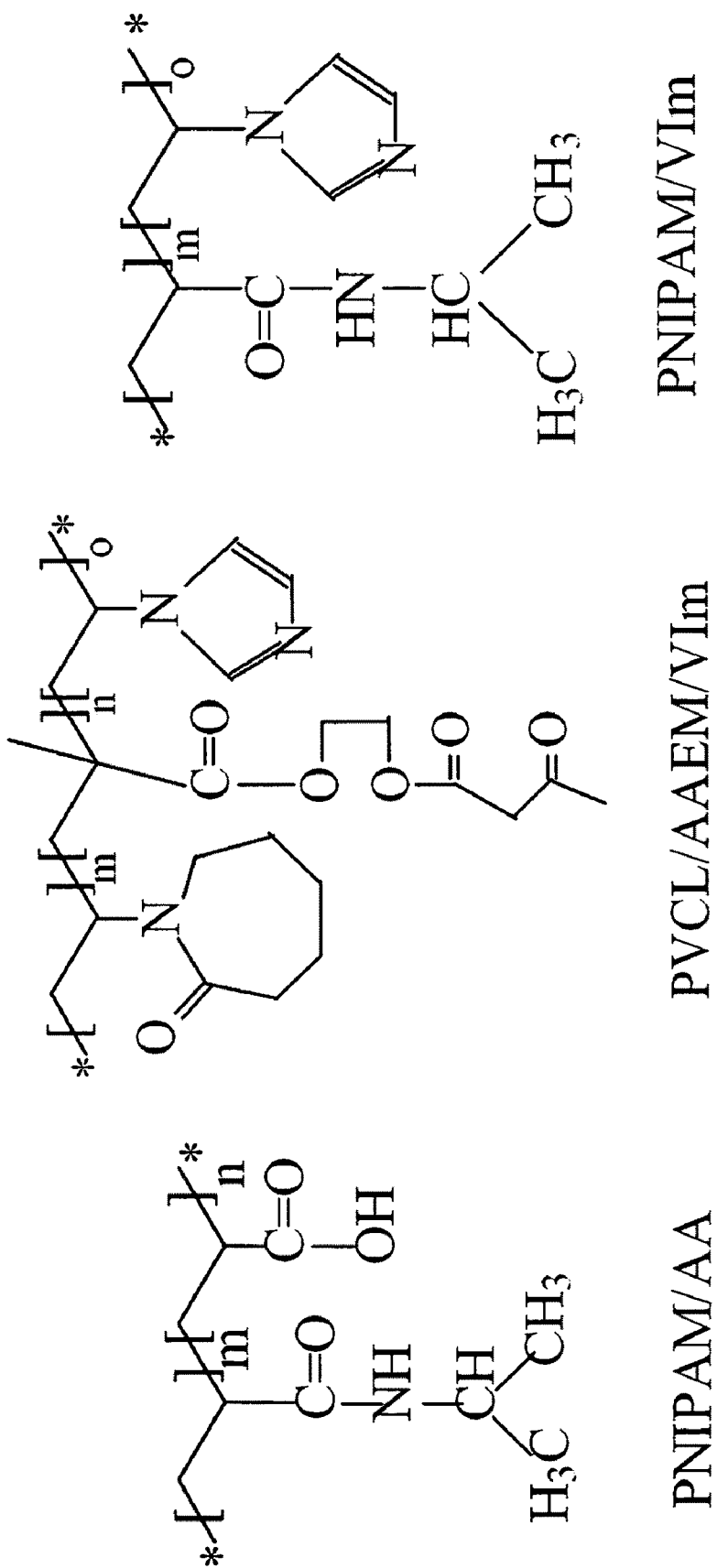
FIG. 2 shows the chemical compositions of three of the polymer microgels of this invention. PNIPAN/AA refers to a copolymer of N-isopropylacrylamide and acrylic acid. PVCL/AAEM/VIm refers to a copolymer of N-vinylcaprolactam, acetoacetylethyl methacrylate, and N-vinylimidazole. PNIPAM/VIm refers to a copolymer of N-isopropylacrylamide and N-vinylimidazole.

For illustrative purposes, the inventors synthesized two non-limiting different types of microgels. One, based upon poly(N-isopropyl acrylamide) (PNIPAM), has an open, porous structure in water at temperatures below the volume phase transition temperature (see a) R. Pelton, *Adv. Colloid Interface Sci.* 2000, 85, 1; b) V. Boyko, A. Pich, Y. Lu, S. Richter, K.-F. Arndt). The second, based upon a copolymer of N-vinylcaprolactam (VCL) and acetoacetylethyl methacrylate (AAEM), has a core-shell structure, (see V. Boyko, A. Pich, Y. Lu, S. Richter, K.-F. Arndt and H.-J. Adler, *Polymer* 2003, 44/25, 7821; and A. Pich, A. Teissier, V. Boyko, Y. Lu and H.-J. P. Adler, *Macromolecules* 2006, 39, 7701). The reactivity ratio mismatch between these two monomers leads to formation of a water-insoluble AAEM-rich core surrounded by a VCL-rich water-swollen corona. Both microgels undergo a collapse transition when their solutions in water are heated above 30-35° C. The chemical structures of these microgels are shown in FIG. 2.

Details of the synthesis of the composites will now be described. The monomers N-isopropylacrylamide (NIPAM, 99%, Aldrich), N-vinylcaprolactam (VCL, 99%, Aldrich), acetonacetoxyethyl methacrylate (AAEM, 97%, Aldrich), acrylic acid (AA, 99%, Aldrich) and vinylimidazole (VIm, 95%, Aldrich) were used for microgel synthesis after inhibitor removal. The initiators 2,2'-azobis(2-methylpropyonamidine) dihydrochloride (AMPA, 99%, Aldrich) and potassium persulfate (KPS, 99%, Aldrich) were recrystallized before use. The cross-linker N,N-methylenebisacrylamide (BIS, 99%, Aldrich), the stabilizers cetyltrimethylammonium bromide (CTAB, Aldrich) and sodium dodecyl sulfate (SDS, 99%, Aldrich), and analytical grade tetrahydrofuran (THF, Aldrich) were used as received. Deionized water was obtained from a Millipore Milli-Q water purification system.

The experiment on CdSe quantum dots reported here were carried out with a single sample of trioctylphosphine oxide-passivated QDs (CdSe/TOPO) with a band-edge absorption at 588 nm and a mean core diameter of 4.5±0.3 nm as determined by transmission electron microscopy (TEM). This sample was prepared by the standard method described by C. B. Murray, D. J. Norris and M. G. Bawendi, *J. Am. Chem. Soc.* 1993, 115, 8706-8715. A small number of experiments were carried out with a sample of oleic acid-capped PbS QDs (PbS/OA) with a band-edge absorption at 1108 nm and a mean core diameter of 3.5±0.5 nm as determined by TEM. This sample was prepared by the standard methods described by M. A. Hines and G. D. Scholes, *Adv. Mater.* 2003, 15, 1844. The nanoparticles were purified by three successive precipitations with methanol followed by redispersion in toluene to remove free ligand from the sample.

Microgel Synthesis

PNIPAM-based microgels. Appropriate amounts (see Table 1) of NIPAM, the other monomer (AA or Vim), CTAB and BIS (3 mol-%) were dissolved in deionized water in a 100 mL three-neck round-bottom flask equipped with a mechanical stirrer, a reflux condenser, a thermometer and a nitrogen outlet. The monomer mixture was stirred for 30 min at room temperature under a nitrogen purge. The aqueous solution of initiator (KPS for P(NIPAM/AA), AMPA for P(NIPAM/VIm)) was slowly added to the monomer mixture to start the polymerization at 70° C. The reaction was continued for 4 h. The dispersion was then purified by dialysis against the deionized water for a week. The amount of VIm group in PNIPAM/VIm samples was determined by $^1$H NMR with signals at 6.80-7.70 (3H, —NCHNCHCH—) and 3.50-4.10 (1H, —CH$(CH_3)_2$). The VIm content in PNIPAM/VIm microgels is reported in Table 1.

PVCL-based microgels. Appropriate amounts (Table 1) of VCL, AAEM, VIm and BIS (3 mol-%) were dissolved in deionized water. A double-wall glass reactor equipped with a mechanical stirrer and a reflux condenser was purged with nitrogen. A solution of the monomers was placed into the reactor and stirred for 1 h at 70° C. with continuous purging with nitrogen. The reaction was continued for 8 h. The dispersion was then purified by dialysis against the deionized water. For these samples, the amount of VIm incorporated into the microgels was determined by potentiometric titration. The results are summarized in Table 1.

Incorporating QDs into Microgels.

To prepare QD-microgel hybrid composites, aqueous microgel solutions (0.5 mL, 17.0 mg/ml for PNIPAM/VIm; 16.0 mg/ml for PVCL/VIm) were mixed with THF (2 mL). Each mixture was placed into a dialysis bag (Spectra/Por@ Dialysis Membrane, vol=2.5 mL/cm, molecular weight range: >50,000) and dialyzed against THF for 24 h. The ment operating at 200 kV and 13 μA current. Photoluminescence (PL) spectra were taken at room temperature using a SPEX Fluorolog-3 instrument with $\lambda_{ex}$=500 nm. $^{31}$P-NMR spectra were obtained at 25° C. with a Varian System 400 NMR. The samples were held in a capillary tube placed inside the 5 mm NMR tube filled with phosphoric acid-D$_2$O solution. The QDs content of the hybrid microgels were determined by Inductively Coupled Plasma Atomic Emission Spectroscopy (ICP-AES) (Optima 3000 DV equipped with AS-90 autosampler). The instrument was calibrated by using standard aqueous Cd and Se solutions with known concentrations (0.100 mg/L and 4.00 mg/L).

TABLE 1

Amounts of reagents used in the microgel syntheses and the composition of the microgels.

| Sample[a] | Monomer[b] [g] | AAEM, [g] | Stabilize[c] [mg] | Comonomer[d] [mg] | BIS, [mg] | Initiator[e] [g] | Water, [g] | $R_h$[f] [nm] | Comonomer ratio[g] [mol %] | Solids content[h] [%] |
|---|---|---|---|---|---|---|---|---|---|---|
| PNIPAM/AA(25.0%) | 0.500 | — | 10.0 | 148.0 | 0.0310 | 10.0 | 30 | 212 | ~25.0 | 2.1 |
| PNIPAM/VIm(4.85%) | 0.500 | — | 6.1 | 20.8 | 0.0215 | 10.0 | 30 | 113 | 4.85 | 1.8 |
| PNIPAM/VIm(2.78%) | 0.500 | — | 6.1 | 12.5 | 0.0215 | 10.0 | 30 | 161 | 2.78 | 1.7 |
| PNIPAM/VIm(0.87%) | 0.500 | — | 6.1 | 4.2 | 0.0215 | 10.0 | 30 | 116 | 0.87 | 1.6 |
| PVCL/VIm(4.91%) | 1.783 | 0.3210 | — | 71.0 | 0.0600 | 50.0 | 150 | 373 | 4.91 | 1.6 |
| PVCL/VIm(2.88%) | 1.820 | 0.3280 | — | 42.6 | 0.0600 | 50.0 | 150 | 444 | 2.88 | 1.5 |
| PVCL/VIm(0.90%) | 1.858 | 0.3350 | — | 14.2 | 0.0600 | 50.0 | 150 | 231 | 0.90 | 1.5 |

[a]We refer to poly(N-isopropylacrylamide-co-vinylimidazole) microgel as PNIPAM/VIm, poly(N-isopropylacrylamide-co-acrylic acid) microgel as PNIPAM/AA and poly(N-vinylcaprolactam-co-acetoacetylethyl methacrylate-co-vinylimidazole) microgel as PVCL/VIm;
[b]The amount of NIPAM or VCL monomer added for the synthesis of each microgel;
[c]The amount of stabilizer (cetyltrimethylammonium bromide (CTAB) for PNIPAM/VIm and sodium dodecyl sulfate (SDS) for PNIPAM/AA synthesis); no stabilizer for PVCL/VIm synthesis;
[d]The amount of AA or VIm comonomer for each microgel synthesis;
[e]The amount of initiators (potassium persulfate (KPS) for PNIPAM/AA synthesis and 2,2'-azobis(2-methylpropyonamidine) dihydrochloride (AMPA) for PNIPAM/VIm and PVCL/VIm synthesis);
[f]The hydrodynamic radius ($R_h$) determined by 90° DLS in water;
[g]The comonomer (AA or VIm) content (in mol %): the VIm content in PNIPAM/VIm microgels was determined by $^1$H NMR whereas the VIm content in PVCL/VIm was measured by potentiometric titration; The AA feed ratio was estimated from the amount of monomer added in the synthesis;
[h]Determined by gravimetry (freeze drying).

microgel solution in THF obtained (0.5 ml) was mixed with a CdSe/TOPO solution in THF (0.5 mL, 0.4 mg/ml) and then diluted with 2 mL of THF. The mixture was stirred for 24 h at room temperature to ensure complete ligand exchange and incorporation of QD into microgels. The mixture was placed in dialysis bags and dialyzed against THF for 24 h to remove the TOPO molecules replaced by ligand associated with the microgel. Finally the mixture was dialyzed against water for 4 days to ensure complete removal of THF.

Subsequently, we found that the microgel hybrids could be purified and then transferred into water (or other solvents) by centrifugation followed by redispersion in fresh solvent. Once the inorganic particles were incorporated into the microgels, relatively mild centrifugation conditions (6000 rpm for 10 min) were sufficient to sediment the sample.

Characterization

Hydrodynamic radii ($R_h$) were determined by dynamic light scattering (DLS) using a commercial instrument (ALV/SP-125) equipped with an ALV-5000 multi-tau digital time correlator and a He—Ne laser (Uniphase, 32 mW at λ=632.8 nm) was used. In DLS, the Laplace inversion of each measured intensity-intensity time correlation function $G^{(2)}(t, q)$ in the self-beating mode can result in a line-width distribution $G(\Gamma)$. For a pure diffusive relaxation, $\Gamma$ is related to the translational diffusion coefficient D by $\Gamma/q^2$=D at q→0 and C→0 or a hydrodynamic radius $R_h$=$k_B$T/6πηD with $k_B$, T and η being the Boltzmann constant, the absolute temperature, solvent viscosity, respectively. The samples were all measured at an angle of 90°.

Figure 3:
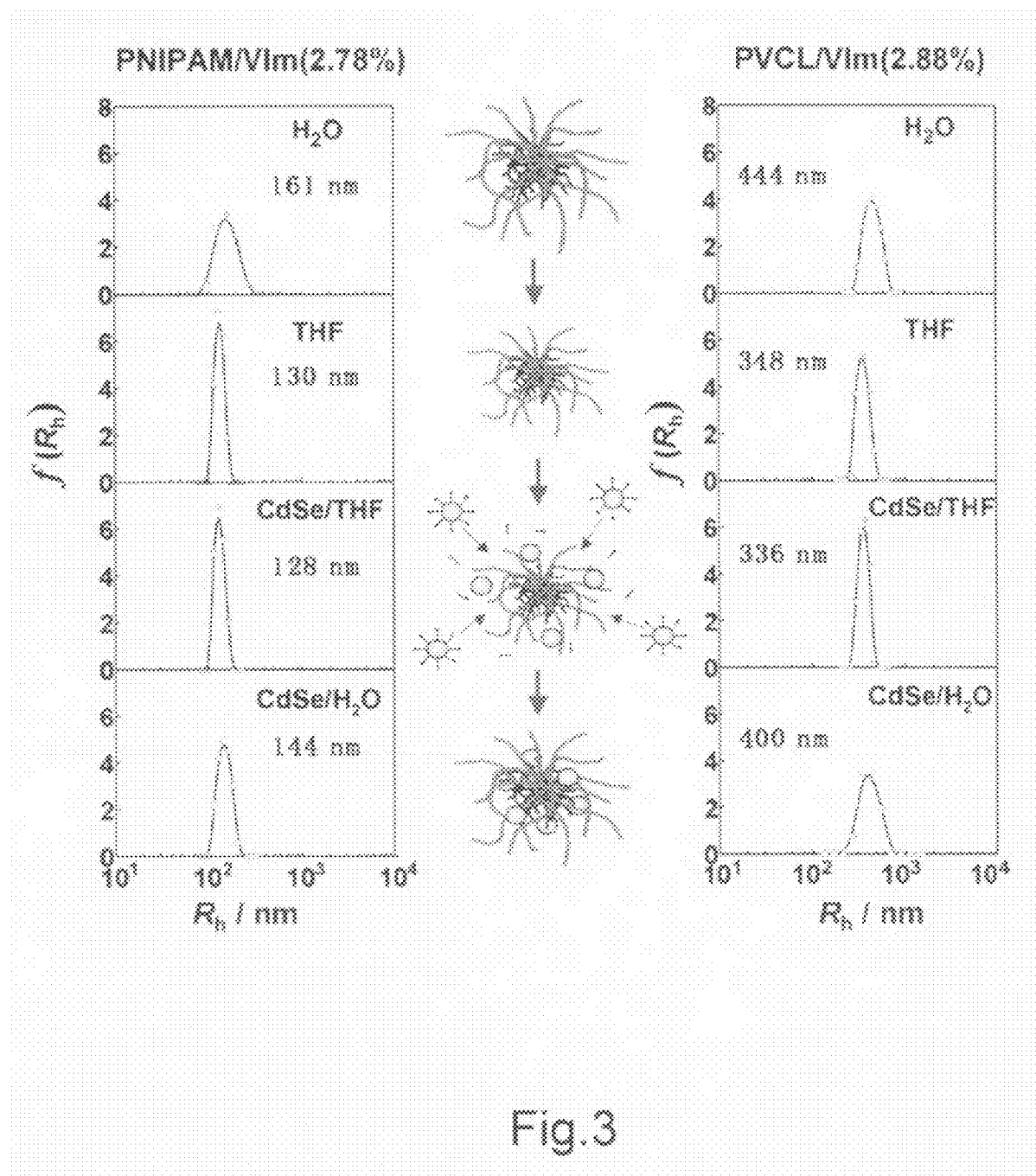
FIG. 3 shows the hydrodynamic radius distributions $f(R_h)$ of different microgels following each step of the preparation microgel/QD composite particles. Left-hand column: PNIPAM/VIm (2.78% VIm) at $1.7 \times 10^{-5}$ g/mL with a final content of 1.1 mg QDs/g polymer; Right-hand column: PVCL/VIm (2.88% VIm) at $1.6 \times 10^{-5}$ g/mL with a final content of 1.5 mg QDs/g polymer. The numbers in each panel refer to the value of $R_h$ characterizing each sample.

Dark field Transmission Electron Microscopy (TEM) images were taken using a Hitachi HD-2000 STEM instru- As mentioned above, right angle dynamic light scattering measurements were employed to monitor the effect of loading QDs into microgels on the microgel size and size distribution. FIG. 3 shows size distribution curves of PNIPAM/VIm and PVCL/VIm microgels containing similar amount of VIm units. The four sets of measurements correspond to the four steps of the QDs loading process shown in FIG. 1. Light scattering results presented in FIG. 3 indicate that no aggregation of the microgel particles occurs during any of the steps of the transfer or loading process. The changes in the magnitude of the hydrodynamic radius ($R_h$) indicate that the microgels shrink after transfer to THF due to the elimination of the hydrogen bonds which are responsible for the swelling of the microgels in water below the volume phase transition temperature. The $R_h$ values, however, are much larger than those of the collapsed microgel particles in water at temperatures above the volume phase transition. Thus the microgels remain extensively swollen by solvent and porous to the penetration of CdSe/TOPO QDs into the interior, where they can interact with the VIm ligands.

The experimental data in FIG. 3 indicate that after addition of QDs, the microgel sizes become slightly smaller and the size distribution remains unaltered. After the final transfer of the CdSe-containing microgel particles into the aqueous phase, the hydrodynamic radii increased. The additional swelling reflects the fact that water is a better solvent for the polymer than THF. Note that the final size of the microgels loaded with QDs in water is smaller than that of the original particle-free samples. Due to the fixation of the QDs in the microgel network, the polymer chains lose some of their mobility and are not able to swell to their original size in water. Such behaviour is reasonable if we consider that every QD can interact with several ligand units, effectively acting as a multifunctional "crosslink" within the microgel particles. The major conclusion drawn from FIG. 3 is that the microgel particles preserve their colloidal stability during solvent exchange followed by QDs loading and can be effectively transferred back to the aqueous phase.

Figure 4:
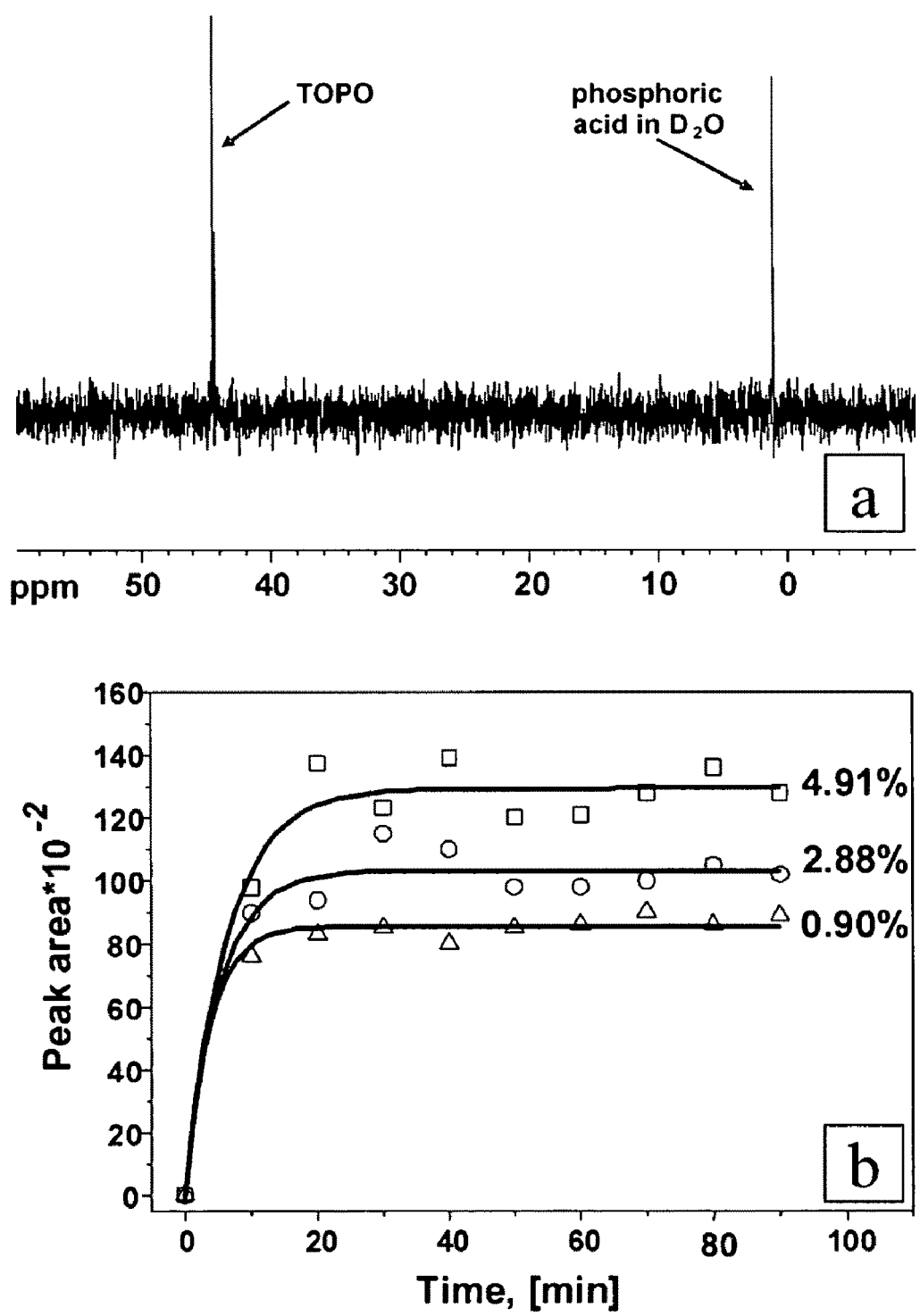
FIG. 4. a) $^{31}$P-NMR spectrum of CdSe (QDs) in THF in the presence of PVCL/VIm (4.91%) microgel with phosphoric acid as an internal standard. b) The increase of the 44 ppm $^{31}$P peak area in the $^{31}$P-NMR spectrum after mixing solutions of CdSe/TOPO QDs with THF solutions of PVCL/VIm microgels containing different amounts of VIm ligand: 1) 0.90 mol %; 2) 2.88 mol %; 3) 4.91 mol % (the concentrations of QDs and microgel are 17.8 mg/ml and 16.0 mg/ml respectively.

To test whether QDs-uptake by the microgels involves ligand exchange, we used $^{31}$P NMR to monitor the release of free TOPO into the THF solution. As reported originally by Emrick (H. Skaff and T. Emrick, *Chem. Commun.* 2003, 1, 52; K. Sill and T. Emrick, *Chem. Mater* 2004, 16, 1240.) and confirmed by us, (X.-S. Wang, T. E. Dykstra, X. Lou, M. R. Salvador, I. Manners, G. D. Scholes and M. A. Winnik, *J. Am. Chem. Soc.* 2004, 126, 7784; M. Wang, J. K. Oh, T. E. Dykstra, X. Lou, G. D. Scholes and M. A. Winnik, *Macromolecules* 2006, 39, 3664;) $^{31}$P NMR spectra of purified TOPO-passivated QDs do not exhibit a peak for free TOPO, but this peak appears at 44 ppm as other ligands displace TOPO groups from the QDs surface. This is the result that we obtain here as shown in FIG. 4(a), demonstrating that ligand replacement occurred. We could follow the amount of TOPO released by carrying out the $^{31}$P-NMR experiments in the presence of phosphoric acid as an internal standard (peak at 0 ppm). As shown in FIG. 4(b), the intensity of the TOPO signal increased with the interaction time between the microgel and the QDs, and the integrated area of this peak increased when similar amounts of CdSe/TOPO were added to solutions in THF of microgels containing increasing amounts of imidazole groups. The release of the TOPO molecules appears to be a fast process, and the intensity of the peak reached its maximum level after about 20 min. If the amount of TOPO released is a measure of the amount of QDs incorporated into the microgels, we would conclude that over this range, the amount of QDs taken up by the microgels increases with the pendant ligand content.

Nature of the Hybrid Structures

Figure 5:
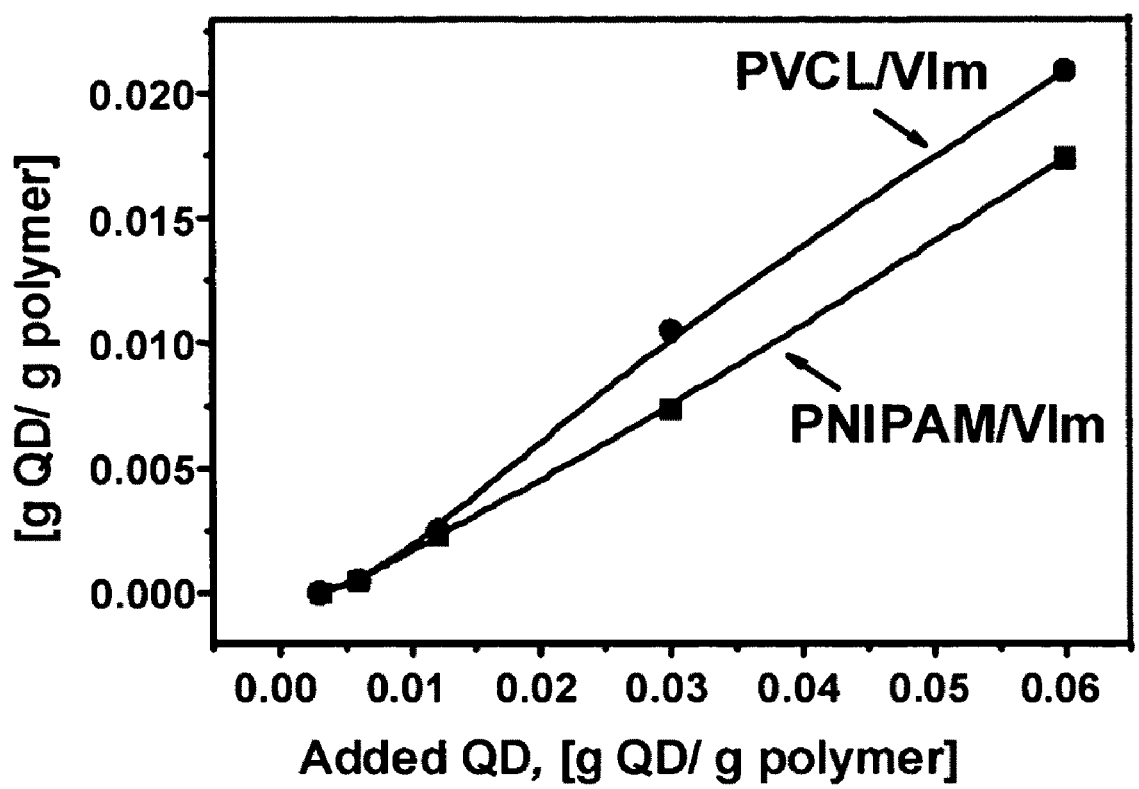
FIG. 5 shows the relationship between the added amount of QD vs QD content in hybrid microgels for PVCL/VIm and for PNIPAM/VIm. The microgel concentration was 0.6 mg/mL.

One can control the QDs content of the microgel by varying the amount or concentration of QDs added to the microgel solution in THF. In FIG. 5, we compare the amount of CdSe/TOPO taken up by the microgels with the amount of QDs added to the microgel solution in THF. For these experiments, we employ two microgel samples. The PVCL sample contained 2.88 mol % VIm groups, whereas the PNIPAM sample contained 2.78 mol % VIm. As shown in FIG. 5, we found a nearly linear increase in the QD content of the microgels with an increase in the QDs concentration in the THF solution. The QD uptake was far from quantitative, and the QDs content, as measured as g (or mg) QDs per g polymer was about a factor of three smaller than that of the solution in which QDs incorporation took place. Thus the efficiency of QDs loading into the microgels in these experiments is about 30%.

The small difference in QDs loading efficiency for the two different microgels is related to their internal structure. Since the diffusion process of the QDs inside microgels is an important step before ligand exchange can take place, the localization of the VIm ligands will play an important role. PVCL/VIm microgels have a core-shell structure that derives from the fact that in the microgel synthesis, AAEM is more reactive than VCL, (V. Boyko, A. Pich, Y. Lu, S. Richter, K.-F. Arndt and H.-J. Adler, *Polymer* 2003, 44/25, 7821;) leading to a morphology with an AAEM-rich core and a VCL-rich shell. (A. Pich, A. Teissier, V. Boyko, Y. Lu and H.-J. P. Adler, *Macromolecules* 2006, 39, 7701) We imagine that in these microgels, the VIm ligands accumulate in the loosely cross linked VCL-rich shell, providing a higher local concentration of VIm groups and better access for the diffusion of QDs to the active sites. In contrast, PNIPAM/VIm microgels have a more uniform structure, with a more random distribution of VIm groups. Here we speculate that initial binding of CdSe QDs to the microgel structure may hinder subsequent diffusion of particles to the interior of the network. Thus we rationalize how PVCL/VIm microgels with a similar VIm content can load more QDs than PNIPAM/VIm microgels.

Figure 6:
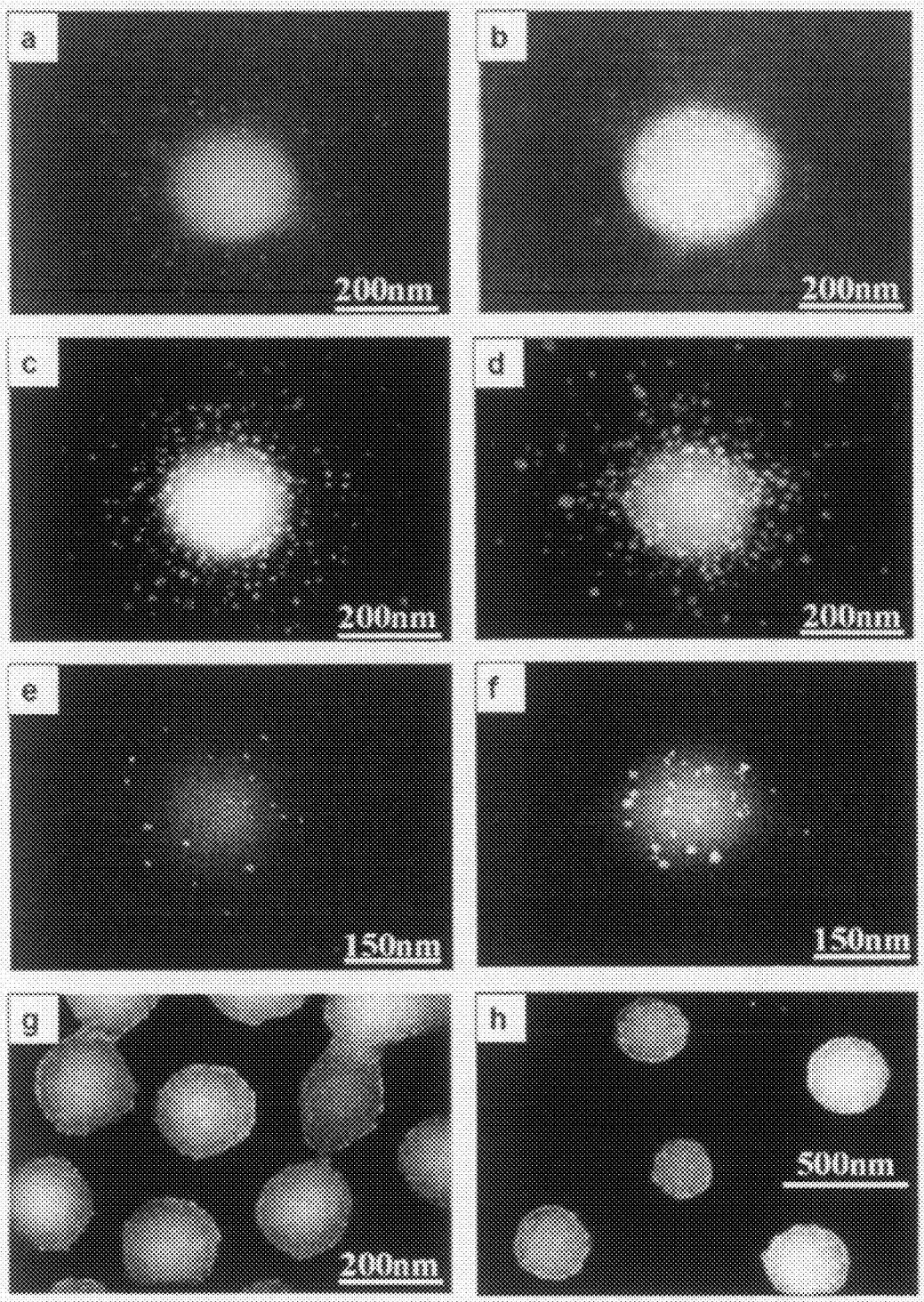
FIG. 6 (*a-d*) show TEM images of individual PVCL/VIm (2.88%) microgel particles filled with different amounts of CdSe QDs (mg QD/g polymer): a) 0.5; b) 2.5; c) 10.5; d) 21.0. In each image, the dense white object is the PAAEM-rich core of the microgel. The QDs are attached to the PVCL/VIm-rich corona.

FIG. 6 presents dark field STEM images of PVCL and PNIPAM microgels loaded with different amounts of CdSe QDs. In these images for PVCL/Vim hybrid microgels, the QDs appear as bright spots, and one can see that the QDs are relatively uniformly distributed in the corona region of the microgels. In contrast to the PVCL/Vim hybrid microgels, the CdSe QDs distribute uniformly inside the PNIPAM microgels because of a more uniform microgel structure. In addition, one can see some local aggregation of the QDs, particularly at higher levels of loading. This aggregation may take place during drying, but it may also occur during the final dialysis step and microgel transfer to the aqueous phase. TOPO groups remaining on the QDs surface will render portions of the surface hydrophobic, and aggregation would provide a means to minimize the total surface area in contact with water molecules. When the QD content of the microgel is low, the QDs are well separated by hydrophilic polymer chains, and no aggregation occurs.

Figure 7:
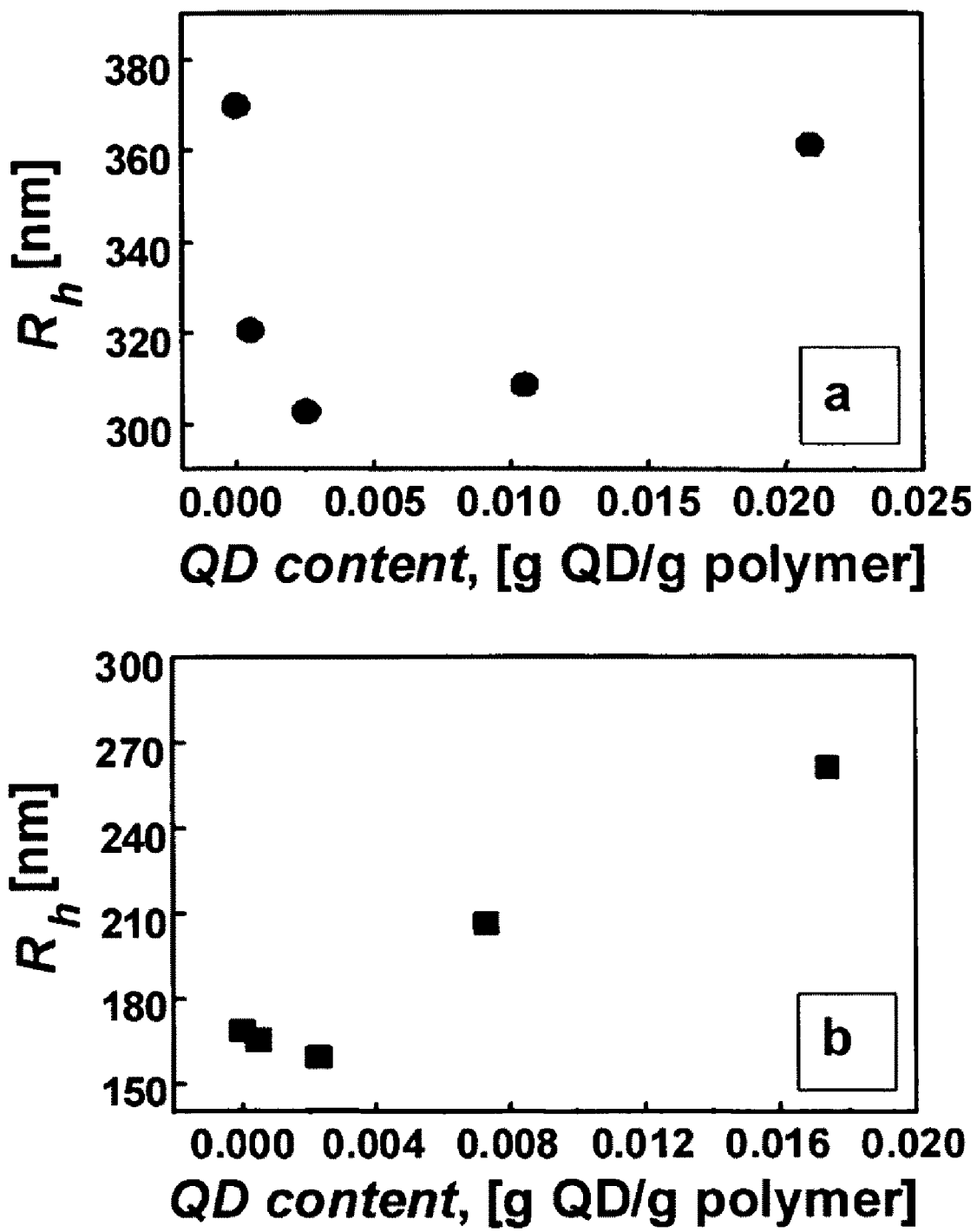
FIG. 7 shows the hydrodynamic radius ($R_h$) of (a) PVCL/VIm (2.88%) hybrid microgels and (b) PNIPAAm/VIm (2.78%) hybrid microgels as a function of CdSe QD content.

At higher loading (up to 5 mg/g polymer), the hydrodynamic radii decrease substantially, as shown in FIG. 7. A greater extent of cross-linking (and perhaps hydrophobic interactions between the QDs) restrict the swelling of the microgels. Even higher levels of loading (above 20 mg/g polymer) lead to a decrease in colloidal stability as inferred from the increase in $R_h$ values measured by DLS, accompanied by an increase in the breadth of the $R_h$ distribution. This increase is almost certainly due to the formation of dimers and small aggregates of microgels in the aqueous solution. In this case, hydrophobic attraction forces will dominate, leading to formation of aggregates. This result leads to the conclusion that at high QD loadings, the QDs accumulate preferably in the microgel shell reducing the efficiency of the steric stabilization provided by hydrophilic microgel outer layer.

As a test of the generality of this approach, we carried out a few additional experiments with a sample of oleic acid-stabilized PbS quantum dots prepared by the method of Hines and Scholes cited above. These nanocrystals ($PbS_{1108}$) have a mean diameter of ca. 3.5±0.5 nm (TEM) and an absorption peak at 1108 nm. Solutions of these QDs in THF could be captured effectively by the PVCL/AAEM/VIm microgels, and even more effectively by the carboxyl groups of PNIPAM/AA microgels. Both samples could then be transferred into water. Dark field TEM images of these composite particles are shown in FIGS. 6g and 6h. We can see that all the PbS QDs are captured in the AAEM core of PVCL/AAEM/VIm microgels, which suggests that the beta-ketoester groups of AAEM rather than the VIm groups displace oleic acid on PbS QDs. We conclude that this microgel exchange method works well for a variety of QDs insoluble in aqueous solution.

Figure 8:
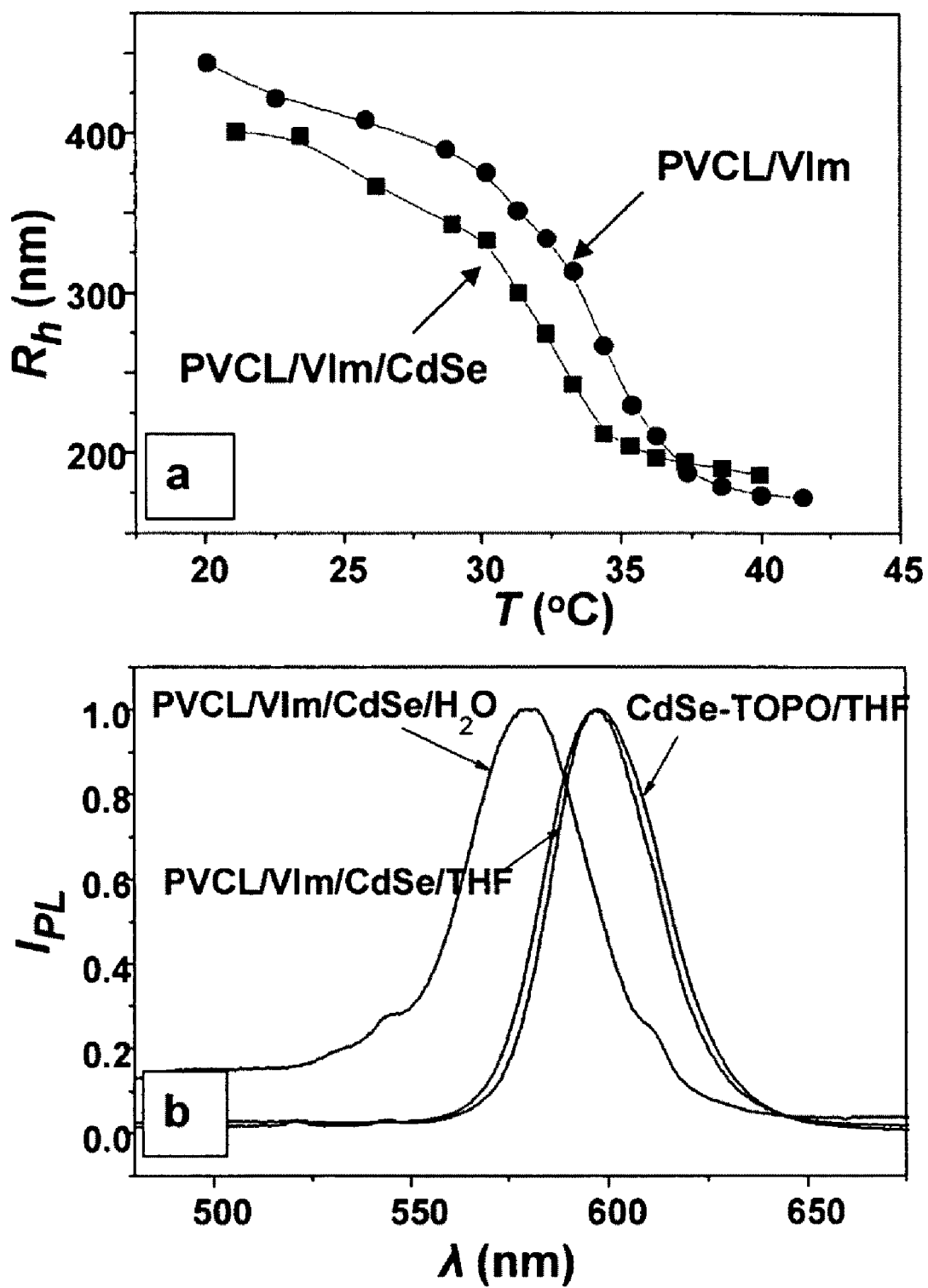
FIG. 8 show a) Temperature dependence of $R_h$ for PVCL/VIm (2.88%) microgel in water with (10.5 mg QD/g polymer) and without QDs. b) normalized emission spectra of CdSe/TOPO in THF and CdSe/PVCL/VIm (2.88%) hybrid microgel (10.5 mg QDs/g polymer) in THF and in water.

The microgels loaded with QDs preserve their temperature-sensitive properties. FIG. 8a shows the variation of hydrodynamic radius with temperature for two PVCL/VIm (2.88%) microgel samples. The microgel sample containing QDs exhibits a similar temperature-response behavior to that of the as-prepared microgel. Increase of the temperature induces collapse of the microgel due to the destruction of the hydrogen bonds that oppose the hydrophobic attraction forces between polymer chains. Both the original microgel and the microgel filled with QDs collapse to similar size, which indicates that QDs do not influence strongly the mobility of the polymer chains above volume phase transition temperature. A similar response is found for a PNIPAM/VIm microgel sample at a similar QDs loading. The volume phase transition temperature is shifted to lower temperatures due to the hydrophobic nature of the QDs. In this case, the QDs provoke faster deswelling of the microgel by enhancing the hydrophobic attraction forces within microgel.

Figure 9:
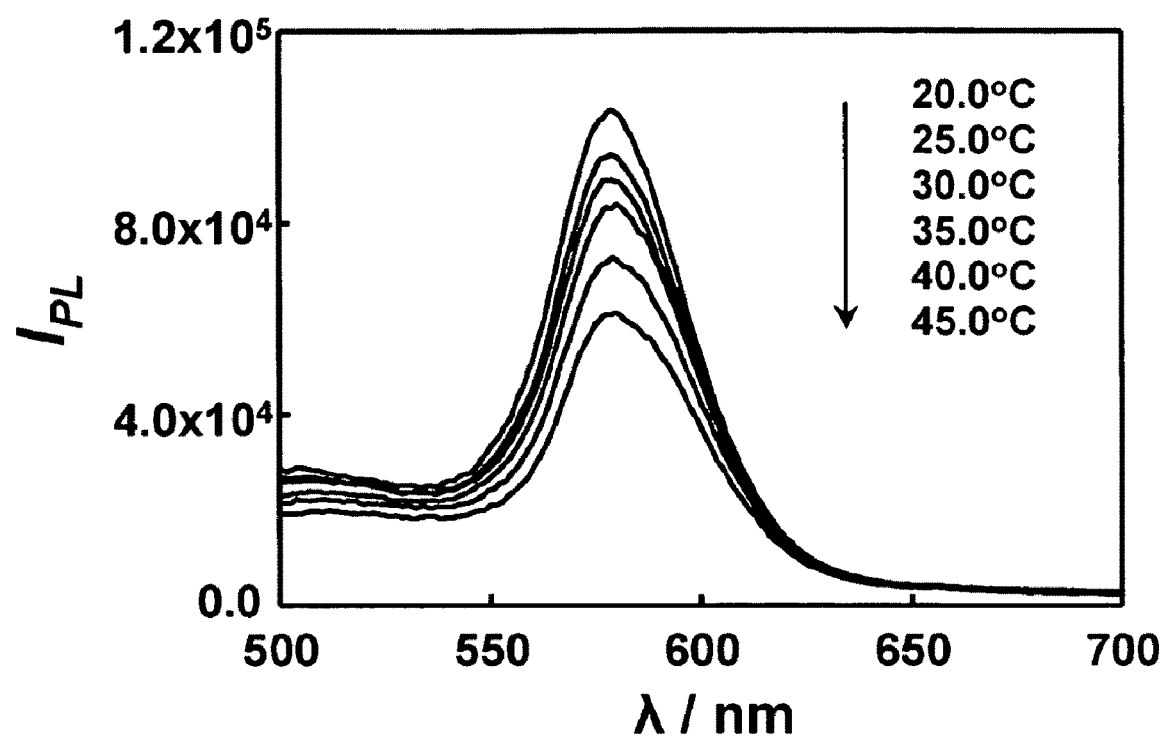
FIG. 9 shows the temperature dependence of emission spectra of CdSe/PVCL/VIm (2.88%) hybrid microgel (10.5 mg QDs/g polymer) in water (0.2 mg/mL).

After transfer to the microgel, the CdSe QDs remain photoluminescent (PL). As seen in FIG. 8b, the PVCL/VIm/CdSe composite in THF has a nearly identical PL spectrum to that of CdSe/TOPO. The emission in water is substantially weaker, and blue shifted, as is shown in FIG. 8b for PVCL/VIm/CdSe. The dramatic reduction of the quantum yield of QDs occurs not during ligand exchange step but during microgel transfer to the aqueous phase. (It is difficult to compare quantum yields because light scattering from the microgel composite masks the UV-Vis absorption spectrum of the QDs.) A similar reduction in PL intensity has been reported for CdSe nanoparticles, coated with poly(N,N-dimethylaminoethyl methacrylate), following transfer from toluene to water. FIG. 9 shows the temperature dependence of the PL emission spectrum of PVCL/VIm/CdSe composite (10.5 mg QDs/g polymer) in water. The PL intensities decreased as the temperature increased, and the effect was reversible. A slight blue shift of the PL maximum wavelength associated with small changes in peak shape accompanied this increase in temperature.

In conclusion, the inventors have demonstrated a new approach for the preparation of hybrid microgels containing inorganic nanoparticles, using TOPO-passivated CdSeQDs and oleic acid capped PbS QDs as examples. In this method, nanoparticles prepared by traditional high temperature methods in organic solvents, and covered with a layer of organic ligands at their surface, are incorporated into the microgel in a water-miscible organic solvent such as THF. The inventors also contemplate that if an aqueous solution of the microgel is stirred with an organic solvent such as dichloromethane (DCM), dichloroethane, ethyl acetate, or anisol, which is not miscible with water, the microgel can be induced to transfer from the aqueous medium to the organic phase. Functional groups introduced as part of the microgel structure exchange with ligands from the nanoparticle synthesis, and the nanoparticles become irreversibly incorporated into the polymer network. These hybrid structures can then be transferred back to water.

The microgels, synthesized in water, retained their colloidal stability during the transfer from water to THF; and the QD-microgel hybrid particles retained their colloidal stability in THF and during transfer from THF to water. The inventors have shown that QD binding to the microgel took place by a ligand exchange process. This approach worked well for polymer microgels of two different compositions, one based upon PNIPAM, and the other on a copolymer of AAEM with N-vinylcaprolactam. Small differences in behavior were noted and attributed to the different internal morphologies of these microgels. The QDs incorporated into the microgels remained photoluminescent, both in THF and in water. The hybrid microgels retained their temperature-sensitive properties in aqueous solution, but the presence of the QDs shifted the volume phase transition to lower temperatures. It is believed that this new approach can be used to incorporate a broad range of nanoparticles into microgels and can also lead to the design of novel multifunctional materials.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims.

Therefore what is claimed is:

1. A method for the preparation of a composite material of microgels containing inorganic nanoparticles with a CdSe/ZnS core-shell semiconductor, the method comprising the steps of:
   a) synthesizing microgels in water;
   b) transferring the microgels to a selected organic solvent to form a microgel dispersion, the microgels of the microgel dispersion having a microgel network, the microgels being selected to contain moieties that can interact with an outer surface of inorganic nanoparticles; and
   c) adding a solution of said inorganic nanoparticles to the microgel dispersion, said nanoparticles having an outer surface covered with hydrophobic ligands that render the inorganic nanoparticles insoluble in an aqueous solution, and wherein some of the said hydrophobic ligands are replaced by said moieties, giving rise to substantially irreversible incorporation of the nanoparticles into the microgel network to produce the composite material and release of the hydrophobic ligands to the organic solvent.

2. The method of claim 1 including a step of transferring the composite material back into water.

3. The method of claim 1 including a step of transferring the composite material back into an organic solvent.

4. The method of claim 1 in which the moieties include amine groups or other basic nitrogen-containing groups that can interact with the outer surface of the inorganic nanoparticle, the amine groups including any one of primary, secondary and tertiary alkyl amines, and aromatic amines, and the basic nitrogen-containing groups include imidazole and pyridine groups.

5. The method of claim 4 in which the basic nitrogen-containing groups include any one or a combination of pyridine, pyrimidine, triazine and quinoline groups.

6. The method of claim 1 in which the moieties include groups selected from the group consisting of carboxylic acid groups, phosphonic acid groups, phosphate groups, 1,2-diol groups and 1,3-diol groups that can interact with the outer surface of the inorganic nanoparticle.

7. The method of claim 1 in which the microgels contain polyethylene glycol chains in addition to the moieties that can interact with the outer surface of the inorganic nanoparticles.

8. The method according to claim 1 wherein said step b) of transferring the microgels to a selected organic solvent to form a microgel dispersion is performed using any one of dialysis against said organic solvent, centrifugation followed by resuspension, or stirring with a water immiscible solvent in which the microgels are soluble which can form a stable colloidal dispersion.

9. The method according to claim 1 wherein said selected organic solvent is miscible with water and is selected from the group consisting of tetrahydrofuran (THF), acteone, methyethyl ketone, N,N-dimethyl formamide (DMF), and N-methyl pyrrolidone (NMP).

10. The method according to claim 1 wherein said selected organic solvent is not miscible with water and is selected from the group consisting of dichloromethane (DCM), dichloroethane, ethyl acetate, and anisole.

11. The method according to claim 1 wherein said hydrophobic ligands are any one of trioctylphosphine oxide, (TOPO), oleyl amine, hexadecyl amine and oleic acid (OA).

12. The method according to claim 2 wherein said step of transferring the composite material from the organic solvent back to water is performed using either dialysis against said organic solvent, or centrifugation, followed by resuspension of the microgels in water.

13. The method according to claim 1 further including a step of removing the released hydrophobic ligands by dialysis or centrifugation in the organic solvent.

* * * * *